Patented June 22, 1948

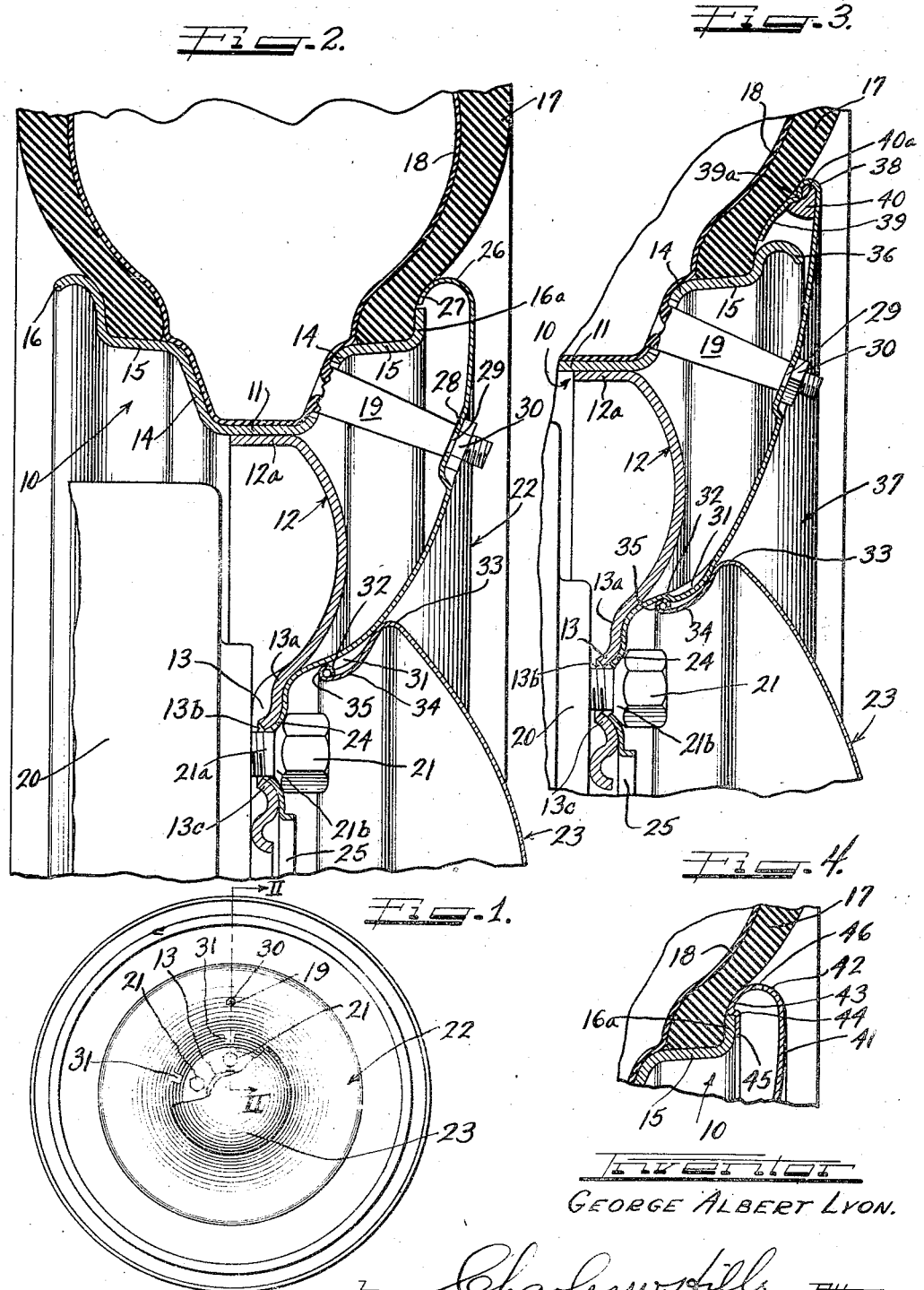
June 22, 1948.  G. A. LYON  2,443,627
WHEEL COVER
Filed Dec. 9, 1943
Inventor
GEORGE ALBERT LYON.

2,443,627

UNITED STATES PATENT OFFICE 2,443,627

WHEEL COVER

George Albert Lyon, Allenhurst, N. J.

Application December 9, 1943, Serial No. 513,547

9 Claims. (Cl. 301—37)

This invention relates to an improved wheel structure and is directed more particularly to an improved cover assembly therefor.

It is an important object of the present invention to provide an improved cover assembly for disposition over the outer side of a wheel structure which cover, in itself, aids in the maintenance and disposition of a tire within the tire rim of the wheel.

It is another important object of the present invention to provide improved retaining means for maintaining my improved cover over the outer side of the wheel.

Still another object of the invention is to provide an improved multi-part cover assembly in which one of the cover parts strengthens and rigidifies the other cover part, and yet whereby the second cover part aids in the maintenance of the companion cover on the wheel.

Still another object of the invention is to provide a multi-part cover assembly having a radially outer annular cover part provided with a cross-sectional configuration of such expanse that it extends from the radially outer extremity of the adjacent side of the tire rim to, in effect, complement the same in the tire retaining action, and also extends radially inwardly to a bolt-on flange of the wheel structure with which it is associated, at which point it is positively secured to the wheel by wheel bolts, this cover portion also being cross-sectionally configurated to generally simulate the side wall of a tire in the tire rim to give the appearance of being a part thereof and a continuation thereof and to appear as a white side wall of the tire when colored white.

Still another object of the present invention is to provide an improved multi-part cover assembly having a radially outer portion possessing the attributes set forth above and also having at a radially inner part thereof a plurality of outwardly extending, circularly aligned, circumferentially spaced bumps arranged to receive an attachment part of a central circular hub cap simulating member which extends over the wheel bolts and the end of the wheel spindle to conceal the same.

In accordance with the general features of one form of the invention, there is provided herein for disposition over the outer side of a wheel structure a multi-part cover assembly including a radially outer portion formed at the radially outer edge thereof to provide an axially inwardly, radially inwardly turned edge to complement the edge portion of the tire rim and to present an axially inner surface for retainingly abutting the adjacent portion at the outer side wall of the tire to maintain the same on the wheel, said cover extending axially inwardly and having an aperture therein for receiving the outer end of a tire valve stem, the stem having a bolt threaded to the outer end thereof to further secure the cover on the wheel structure, said cover part extending radially inwardly and having a portion conforming to the configuration of a bolt-on flange on the wheel and having apertures aligned with the bolt apertures in the flange whereby it receives the wheel bolts in order that the latter may secure the same tightly against the wheel in the mounting function thereof, said cover being further provided at a point slightly radially outwardly of the wheel bolts with circularly aligned, circumferentially spaced, outwardly extending bumps or protuberances arranged to retainingly receive a snap-on flange of a central hub cap simulating cover member.

In accordance with other general features of the invention, there is provided herein for the wheel complementing cover portion, a radially outer margin turned back upon the cover to extend radially inwardly along the adjacent portion of the side wall of the tire, there being provision for the retention of wheel balancing weights in the peak of the turned back portion to reinforce the cover.

In accordance with still other features of the present invention, there is provided herein a cover assembly for disposition over the outer side of a wheel structure, said cover assembly including a radially outer annular part terminating at the radially outer edge thereof in a turned back portion arranged to complement the edge of a tire rim of a wheel over which it is disposed to aid in the retention of a bead of a tire therein, said turned back portion including a stepped part for supportingly, abuttingly engaging the edge of the tire rim to aid in the strengthening of the junction between the tire rim and the cover member.

It is still another object of the present invention to provide an improved wheel structure and particularly, an improved tire rim therefor, said rim being flanged and of the drop center type and having at one edge portion thereof a radially outwardly extending, shortened flange which more readily permits removal of the adjacent bead of the tire onto and off of the rim, said flange being complemented by a cover member disposed over the wheel, said turned back portion of the cover being aligned with the shortened flange of the tire rim to aid the same in maintaining the bead axially inwardly on the tire rim.

Many other objects and advantages of the invention will become apparent from the following description and accompanying drawings, in which:

Figure 1 is a side elevational view of a wheel structure embodying one form of my invention, parts being broken away for illustrative purposes;

Figure 2 is a fragmentary, enlarged cross-sectional view taken on the line II—II of Figure 1;

Figure 3 is a fragmentary, enlarged radial cross-sectional view of a wheel structure including a modified form of my invention; and Figure 4 is an enlarged, radial, fragmentary cross-sectional view of still a further modified form of my invention.

It will be understood that the modifications shown herein are for illustrative purposes only and may be changed or modified without departing from the spirit and scope of the invention as set forth in the appended claims.

In the wheel structure shown herein there is provided an improved tire rim part 10 of the drop center type having a base flange 11 which is secured to the axially inwardly extending peripheral flange of a circular spider or load bearing portion 12 by means of riveting or welding or the like. The central load bearing portion 12 is further provided with a radially inner bolt-on flange 13 having axially offset or recessed portions 13a in which bolt holes 13b are provided for purposes to be explained presently.

The improved tire rim 10 also includes a pair of opposite side wall flanges 14 and a pair of opposite intermediate flanges 15, there being provided at the axially inner side of the wheel an edge portion 16 while the radially outer extremity of the other side of the rim includes a radially outwardly extending flange 16a terminating at a point on a radial plane which is closer to the center than the plane through the radially outer extremity of the opposite side of the tire rim as shown at 16.

With such a construction it will be seen that application of the beads of the tire casing 17, which is provided with an inner tube 18 and an outwardly extending valve stem 19 which protrudes through a suitable aperture in the respective side wall flange 14, is greatly facilitated since they can be applied over the flange 16a from the outside of the wheel with considerable ease because of the reduced radial dimension of the flange 16a, while at the same time removal of the tire from the rim 10 is also facilitated.

To the end that the wheel structure may be secured to the vehicle and particularly to the brake drum 20, shown in Figure 2, wheel bolts 21 having threaded stems 21a and beveled inner faces 21b are provided for cooperation through the bolt holes 13b which are defined by surrounding, axially inwardly, obliquely disposed flanges 13c on the bolt-on flange 13.

The improved cover assembly of Figure 2 includes a radially outer annular part 22 and a central circular hub cap simulating part 23. The radially outer annular part 22 is provided with a cross-sectional configuration generally simulating the configuration of the side wall of the tire 17 in the tire rim 10 and is provided with a radial expanse whereby the exposed portion thereof extends from the vicinity of the radially outer extremity of the tire rim 10, radially inwardly to a point considerably inwardly of the junction between the tire rim and the central load bearing portion 12. Specifically the cover part 22 includes at its radially inner portion a radially inwardly extending flanged part 24 which is also provided with bolt apertures for alignment with the apertures in the bolt-on flange 13 and with a cross-sectional configuration whereby it conforms to the configuration of the outer surface of the bolt-on flange, whereby the two may be nested together and secured in this nested relationship when the cover is superimposed on the bolt-on flange 13 by application of the wheel bolts 21 as shown in Figure 2. If desired, the radially inner extremity of the cover 22 may be provided with a generally axially outwardly extending reinforcing flange 25.

The radially outer portion of the cover member 22 is so arranged that it complements the shortened flange 16a of the tire rim 10, thus to aid in the maintenance of the outer side of the tire within the tire rim. It will be understood, of course, that in the mounting or removal of the tire, the cover 22 is first removed in a manner to be presently described and that after the mounting operation the cover is disposed in the position shown and tightened onto the wheel.

To the end that the cover may complement the tire rim 10 in retaining the tire thereon when tightened as above described, there is provided at the radially outer margin thereof, an axially inwardly curled portion 26 terminating in a generally radially inwardly curled, circular terminal portion 27 which is arranged for alignment with the radially outwardly extending flange 16a of the tire rim 10, thereby to provide a continuation of the inner surface of the flange 16a against which a radially outer circular portion of the tire may rest.

As will be seen from Figure 2, the valve stem 19 is of such a length that it protrudes beyond the confines of the chamber formed behind the cover member 22 and accordingly the cover is provided with an axially inwardly indented portion 28 which is apertured as at 29 to receive the end of the valve stem therethrough. The outwardly extending portion of the valve stem 19 is preferably threaded to receive a nut 30 which may be screwed axially inwardly to pressingly abut the adjacent portion of the outer surface of the indented part of the cover 22, thereby to further aid in anchoring the cover axially inwardly against the wheel structure and aiding in the withdrawal of the part 27 of the cover axially inwardly into tight supporting engagement with the adjacent portion of the outer side wall of the tire 17.

To the end that the cover part 22 may be further rigidified and reinforced and also to the end that the central crowned, hub cap simulating cover part 23 may be detachably secured thereto, the cover part 22 is provided at a radially inner portion thereof with generally radially inwardly extending, circularly aligned, circumferentially spaced humps 31 having substantially axially inwardly facing cam surfaces 32. The cover member 23 is provided with a radially outwardly extending, intermediate beaded portion 33 which is defined on the axially inner side thereof by a generally axially inwardly extending snap-on flange 34 terminating in a peripheral snap-on bead 35, the flange 34 and the bead 35 being resilient for purposes to be described presently.

In assembling the structure described above, it will be seen that with the cover 22 removed from the wheel structure, the operator may easily and readily force the beads of the tire 17 axially inwardly over the shortened radially outwardly extending flange 16a of the axially outer side of the tire rim 10. Thereafter the cover member 22 is aligned concentrically with the wheel structure so that the bolt holes therein are also aligned with the bolt holes 13b of the central load bearing portion 12 of the wheel. Thereupon the operator inserts the wheel bolts 21 through the aligned apertures and screws the bolts home into the brake drum 20 until the respective beveled inner faces 21b of the heads of the bolts pressingly engage the adjacent portion at the outer surface of the cover 22 and force the same tightly against the flanges 24 surrounding the bolt holes 13b in the bolt-on flange 13 of the wheel. In so aligning the bolt holes of the cover with those of the wheel, it will be seen that the aperture 29 of the cover is also aligned with the outer end of the tire valve stem 19, whereby the latter protrudes through the apertures 29 and is securely pressed, at a radially outer part thereof against the wheel structure by application of the nuts 30 on the outer end of the valve stem. In applying the nuts 30 it will be seen that the radially outer portion of the cover and particularly the flange 27 thereof will be pressed tightly against the tire to complement the tire rim in providing a radially extending wall to the adjacent bead of the tire 17 on the wheel structure and between the flanges of the tire rim 10.

After the assembly has been completed to the extent above described, the cover member 23 is concentrically aligned centrally of the wheel structure and forced axially inwardly to such a degree that the snap-on flange 35 thereof comes to rest resiliently behind and against the shoulders 32 of the humps or protuberances 31. From Figure 2 it will be seen that when the cover part 23 is in its ultimate position, the radially outwardly extending beaded portion thereof supportingly abuts the radially outer intermediate portion of the cover part 22 whereby the latter is yet further supported in its assembled relationship upon the wheel structure.

When it is desired to remove the tire from the tire rim, it is merely necessary to insert the point of a pry-off tool behind the bead 33 of the cover member 23, whereupon the latter may be drawn resiliently from its snap-on relationship with the cover member 22. Thereafter the bolts 21 may be unscrewed and removed together with the nuts 30, whereupon the cover member 22 is removable axially outwardly of the wheel structure. Thereafter the operator may easily remove the beads of the tire over the shortened flange 16a of the tire rim 10.

In constructing the cover assembly above described, it is preferable that the cover assembly, particularly the cover member 22, be constructed from relatively heavy sheet steel which, if desired, may be stainless to augment the ornamental effect thereof.

In the constructions of Figures 3 and 4, the tire rim 10 is also of the drop center type having a base flange 11 which may be secured as by riveting or welding or the like to the axially inwardly extending peripheral flange 12a of the central load bearing portion. Also the central load bearing portion 12 is provided at the radially inner part thereof with a bolt-on flange 13 having an axially offset or depressed portion 13a provided with bolt holes 13b. The tire rim 10 is further provided with similar side wall flanges 14 and intermediate flanges 15. However, in this rim construction the edge portion 36 is provided with an axially outwardly, slightly radially inwardly curved terminal part but is shortened radially inwardly to again facilitate passage of the beads of the tire 17 thereover. As will be seen from Figure 3 the tire 17 is also provided with an inner tube 18 having an outwardly extending valve stem 19 which protrudes through an aligned aperture in the respective side wall flange 14.

In this construction, the radially inner part of the radially outer, annular cover member 37 is constructed similar to that portion of the cover member 22 of Figure 2 and accordingly the parts are similarly identified. Furthermore, in this construction the central cover member is identical to that described in conjunction with the construction of Figure 2 and accordingly similar parts are similarly identified.

The construction of Figure 3 differs principally from that of Figure 2 in the radially outer portion thereof. In this construction the outer cover member 37 extends radially outwardly beyond the shortened edge portion 36 of the tire rim a considerable distance and is then bent back as at 38 to provide a generally radially inwardly extending, axially inner flange 39 which bears against the adjacent portion of the side wall of the tire 17 with pressure engagement due to the axial inward attachment thereof on the wheel by means of wheel bolts 21, the nuts 30 and the valve stem 19 and the pressure of the central hub cap simulating cover part 23 thereagainst. To the end that the size of the wheel balancing weights which are used may be reduced, this reduction in weight being compensated for by the increase of the lever arm about which the weights operate, they may be, as shown at 40, inserted at the radially outer extremity of the cover member 37 between the radially outer exposed portion thereof and the junction of that portion with the flange 39. Thus it will be seen that the weights 40 are disposed at a considerably increased distance from the center of the wheel, whereby their balancing effect on the wheel is much greater.

In the construction of Figure 4, the wheel structure is similar to that shown in Figure 2. Also the cover assembly to which the construction of Figure 4 may be adapted is similar, at the radially inner part thereof, to that described in conjunction with Figures 2 and 3.

In the construction of Figure 4, the radially outer margin of the radially outer cover part 41 is curled axially inwardly as at 42 and then radially inwardly back upon itself as at 43. This bent back portion 43 terminates in a stepped part 44 which in turn terminates in a radially inwardly extending flange 45 arranged for alignment with the adjacent portion of the outer surface of the radially outwardly extending flange 16a of the tire rim 10. The portion 43 of the cover is arranged for alignment with the flange 16a of the tire rim 10 and thus the stepped part 44 overlies the radially outwardly exposed edge of the tire rim. With such a construction it will be seen that the cover 41 again complements the foreshortened edge portion of the tire rim 10 and when attached to the wheel structure in the manner above described, complements the tire rim to aid in maintenance of the tire thereon. Furthermore, it will be seen that the radially outer margin of the cover 41 is positively secured against radial inward crushing action during operation of the tire by means of the engagement of the stepped portion 44 thereof with the exposed edge of the flange 16a of the tire rim. If desired, a plurality of openings 46 may be provided at the radially outer extremity of the cover member 41 thereby to permit egress of dirt and moisture from behind the cover by means of centrifugal force during operation of the vehicle.

From the foregoing it will be seen that there is provided herein an improved wheel structure and also an improved cover assembly, the wheel structure being such that the operator may mount and remove the beads of the tire with respect to the rim with little or no difficulty due to the foreshortening of one side of the rim. It will also be seen that this foreshortening of the portion of the rim which ordinarily serves to support the tire therein is complemented by the provision of a cover assembly which is securely and rigidly maintained upon the wheel structure in an improved manner and which also extends radially outwardly of the adjacent portion of the rim to facilitate the maintenance of the tire thereon.

As explained above, the improved construction provided herein also, as shown in Figure 3, affords the provision of wheel balancing weights at a point further removed from the central portion of the wheel, whereby the throw thereof is greater, thus enabling the weights to be much more effective than heretofore in balancing the wheel.

Many various expedients may be utilized for maintaining the wheel balancing weights in the position shown in Figure 3, however, in the present instance, there are shown indentations 40a on the axially inner surface of the weights, these indentations being adapted to receive humps 39a formed in the flange 39 of the cover, these humps extending axially outwardly to be embedded in the indentations of the weights. Preferably a plurality of these indentations are circumferentially spaced around the flange 39 whereby the weights may be quickly and easily slipped from one to the other in order to make a proper wheel balancing adjustment.

What I claim is:

1. In a wheel structure, including a wheel having a tire rim and a central load bearing portion including a central bolt-on flange provided with bolt receiving apertures, a cover assembly including a radially outer annular portion having a radially outwardly extending part and a radially inner part arranged to conform to the configuration of the bolt-on flange of a wheel with which it is associated and having bolt receiving apertures therein arranged for alignment with bolt receiving apertures in the bolt-on flange of such a wheel, said radially outer cover portion also including at the radially outer margin thereof a generally axially inwardly, radially inwardly extending turned back part arranged to abuttingly support a tire in a wheel structure with which it is associated and also being arranged to comprise substantially a radial outward continuation of the radially outer extremity of a tire rim in which the abutting tire is mounted the radially inner part of the outer annular portion of the cover having a reinforcing series of generally radially extending, circularly aligned spaced humps including substantially axially inwardly facing cam surfaces, and a central circular hub cap simulating member including a generally axially inwardly extending retaining part arranged for detachable engagement with said cam surfaces of the humps and coacting with the humps to rigidify said outer annular portion of the cover.

2. In a wheel structure including a tire rim of the drop center, flanged type and a central load bearing portion, said tire rim including at least one edge portion comprising a foreshortened radially outwardly extending flange over which the beads of a tire in the rim may be passed with facility, a cover including a radially outer marginal part turned back upon the cover to provide a flange so disposed as to comprise a continuation of the foreshortened flange of the rim and to abuttingly support an adjacent portion of the surface of a tire in the rim, and terminating in an axially outwardly stepped circular part arranged to rest against the edge of said foreshortened flange on the rim, said stepped part terminating in a radially inwardly extending terminal flange arranged to abuttingly engage the adjacent portion of the outer surface of said foreshortened flange on the rim.

3. In combination, in a wheel structure, a wheel including a multi-flanged drop center type of tire rim and a wheel body with a central bolt-on flange, said rim having projecting therefrom a valve stem, a wheel cover of relatively heavy sheet material for disposition over said rim and wheel body and having an outer marginal turned portion formed to overhang the adjoining outer flanged edge of the tire rim and extending radially and axially inward from said edge over the junction of said wheel rim and body, and means for securing said cover to said bolt-on flange and with said turned portion in tight contact with the wall of the tire at said rim edge, said cover between its outer turned portion and the fastening to said bolt-on flange being clamped to the free extremity of the valve stem.

4. In combination, in a wheel structure, a wheel including a multi-flanged drop center type of tire rim and a wheel body with a central bolt-on flange, a wheel cover of a relatively heavy sheet material for disposition over said rim and wheel body and having an outer marginal turned portion formed to overhang the adjoining outer flanged edge of the tire rim and extending radially and axially inward from said edge over the junction of said wheel rim and body, and means for securing said cover to said bolt-on flange and with said turned portion in tight contact with the wall of the tire at said rim edge, said turned outer portion of the cover having means thereon for ready attachment to it radially beyond said rim edge of wheel balancing means concealed by a portion of the cover beyond said rim edge.

5. In a wheel structure including a flanged tire rim and a central load bearing portion, said tire rim having the axially outer flange structure thereof of reduced radial depth to facilitate the passage of the beads of a tire into and out of the rim, a circular cover member of a cross sectional shape which generally simulates a side wall extension of a tire in the rim and having a radially inner portion secured to said central load bearing portion, said cover member extending in concealing relation to said tire rim and having the radially outer margin thereof extending in axially spaced relation to said reduced depth rim flange structure and radially outwardly therebeyond to an extent approximately equal to the reduction in radial depth of said flange structure, said radially outer margin being turned axially rearwardly and radially inwardly into engagement with the side of the tire closely adjacent to said rim flange structure and being constructed and arranged to serve as a retainer for the tire replacing the omitted portion of said reduced flange structure and being movable directly axially into and out of such retaining position, and means intermediate said radially inner portion and said outer margin of said cover rigidifying and reinforcing the same against stress thereagainst from the engaged tire.

6. In a wheel structure including a flanged tire rim and a central load bearing portion, said tire rim having the axially outer flange structure thereof of reduced radial depth to facilitate the passage of the beads of a tire into and out of the rim, a circular cover member of a cross sectional shape which generally simulates a side wall extension of a tire in the rim and having a radially inner portion secured to said central load bearing portion, said cover member extending in concealing relation to said tire rim and having the radially outer margin thereof extending in axially spaced relation to said reduced depth rim flange structure and radially outwardly therebeyond to an extent approximately equal to the reduction in radial depth of said flange structure, said radially outer margin being turned axially rearwardly and radially inwardly into engagement with the side of the tire closely adjacent to said rim flange structure and being constructed and arranged to serve as a retainer for the tire replacing the omitted portion of said reduced flange structure and being movable directly axially into and out of such retaining position, and means intermediate said radially inner portion and said outer margin of said cover rigidifying and reinforcing the same against stress thereagainst from the engaged tire, said reinforcing means comprising a series of integral generally radially extending circularly aligned spaced humps and a hub cap simulating member engaging said humps and serving as part of the reinforcing means.

7. In a wheel structure including a flanged tire rim and a central load bearing portion having a depressed bolt-on flange, the outer retaining flange of said rim being of reduced radial depth in order to facilitate the passage of the beads of a tire into and out of the rim, a cover member of radial depth and configuration simulative of a radially inward extension of the tire side wall and having its outer margin formed to cooperate with said outer rim flange to engage and retain the tire in the rim, the inner margin of said cover being in engagement with said bolt-on flange, bolts securing said margin to said bolt-on flange, a valve stem extending from said tire rim and secured to said cover for assisting in holding the cover in place, a plurality of generally radially extending, annularly spaced elongated humps integral with the cover and rigidifying the same in conjunction with the bolted-on inner margin and said valve stem securement to resist deflection and distortion of the cover due to the engagement with said tire, and a hub cap member engaging said humps and retained thereby in assembly with the cover, said hub cap member engaging against the cover radially outwardly and further reinforcing the same against distortion.

8. A cover assembly including an annular cover member having a central bolt-on flange for attachment to a wheel by means of the bolts with which the wheel is secured to a vehicle, a portion of the cover annulus axially outwardly from the bolt-on flange having an annular series of generally radially extending and radially inwardly protruding reinforcing ribs providing at their radially inner ends cover retaining shoulders, and a circular cover member having an edge thereof retainingly engaged by said shoulders.

9. In a cover assembly for disposition on the outer side of a vehicle wheel of the kind having a central bolt-on flange, a cover annulus having a dished central bolt-on flange portion arranged for attachment over the bolt-on flange of the wheel and an axially outwardly spaced adjacent portion having integral therewith radially inwardly protruding formation providing generally axially inwardly facing cover retaining shoulder means, and an inner circular cover member having an edge in removable retaining engagement with the shoulder means.

GEORGE ALBERT LYON.

REFERENCES CITED

The following references are of record in the file of this patent:

UNITED STATES PATENTS

| Number | Name | Date |
|---|---|---|
| 737,745 | Kronenberg | Sept. 1, 1903 |
| 1,321,992 | Disselkoen | Nov. 18, 1919 |
| 1,637,160 | Rapeport | July 26, 1927 |
| 1,750,673 | La Brie | Mar. 18, 1930 |
| 1,765,858 | Anderson | June 24, 1930 |
| 1,980,690 | Lyon | Nov. 13, 1934 |
| 2,021,240 | Main | Nov. 9, 1935 |
| 2,031,355 | Zerk | Feb. 18, 1936 |
| 2,044,654 | Whited | June 24, 1936 |
| 2,158,125 | Horn et al. | May 16, 1939 |
| 2,166,216 | Lyon | July 18, 1939 |
| 2,183,220 | Horn | Dec. 12, 1939 |
| 2,244,014 | Lyon | June 3, 1941 |
| 2,328,301 | Shaw | Aug. 31, 1943 |
| 2,329,945 | Schatzman | Sept. 21, 1943 |

FOREIGN PATENTS

| Number | Country | Date |
|---|---|---|
| 298,042 | Great Britain | Oct. 11, 1928 |